United States Patent
Suh et al.

(10) Patent No.: US 8,006,308 B2
(45) Date of Patent: *Aug. 23, 2011

(54) RECORDING MEDIUM WITH COPY PROTECTION INDICATING INFORMATION AND APPARATUS AND METHODS FOR FORMING, RECORDING, REPRODUCING AND RESTRICTING REPRODUCTION OF THE RECORDING MEDIUM

(75) Inventors: Sang Woon Suh, Seoul (KR); Jin Yong Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1178 days.

This patent is subject to a terminal disclaimer.

(21) Appl. No.: 10/762,536

(22) Filed: Jan. 23, 2004

(65) Prior Publication Data
US 2004/0168075 A1   Aug. 26, 2004

(30) Foreign Application Priority Data
Feb. 10, 2003   (KR) .................. 10-2003-0008317

(51) Int. Cl.
G06F 7/04   (2006.01)
G06F 17/30   (2006.01)
G06F 12/14   (2006.01)

(52) U.S. Cl. ............. 726/26; 726/27; 713/189; 713/193

(58) Field of Classification Search .................. 380/201, 380/228, 239, 241; 713/165, 182, 189, 193; 705/51; 726/26–27
See application file for complete search history.

(56) References Cited

U.S. PATENT DOCUMENTS

| | | | |
|---|---|---|---|
| 4,879,707 A | 11/1989 | Getreuer et al. | |
| 5,295,127 A | 3/1994 | Verboom et al. | |
| 5,572,507 A | 11/1996 | Ozaki et al. | |
| 5,596,639 A | 1/1997 | Kikinis | |
| 5,689,486 A * | 11/1997 | Shimizu et al. ............ | 369/47.24 |
| 5,703,859 A | 12/1997 | Tahara et al. | |
| 5,706,268 A | 1/1998 | Horimai | |
| 5,737,286 A * | 4/1998 | Timmermans et al. .... | 369/44.13 |
| 5,799,501 A | 9/1998 | Leonard et al. | |
| 5,802,174 A | 9/1998 | Sako et al. | |
| 5,809,006 A | 9/1998 | Davis et al. | |
| 5,818,805 A | 10/1998 | Kobayashi et al. | |
| 5,848,050 A | 12/1998 | Nagasawa et al. | |
| 5,878,007 A | 3/1999 | Matsumoto et al. | |
| 5,892,797 A | 4/1999 | Deng | |

(Continued)

FOREIGN PATENT DOCUMENTS

CN   1152170   6/1997

(Continued)

OTHER PUBLICATIONS

Office Action for corresponding Chinese Application No. 200480000399.8 dated Sep. 1, 2006 and European Search Report and Supplementary European Search Report.

(Continued)

*Primary Examiner* — Benjamin E Lanier
(74) *Attorney, Agent, or Firm* — Harness, Dickey & Pierce

(57) ABSTRACT

A recording medium, such as a high-density and/or read-only recording medium, such as BD-ROM, which includes copy protection indicating information, which can identify whether copy protection information is needed or not for the playback of contents stored on the recording medium, and to methods and apparatuses for forming, recording, and reproducing data on the recording medium.

31 Claims, 6 Drawing Sheets

U.S. PATENT DOCUMENTS

| | | | |
|---|---|---|---|
| 5,894,463 A | 4/1999 | Okawa et al. | |
| 6,021,199 A * | 2/2000 | Ishibashi | 380/217 |
| 6,031,815 A | 2/2000 | Heemskerk | |
| 6,072,758 A | 6/2000 | Tajiri | |
| 6,150,888 A | 11/2000 | Nakazawa | |
| 6,215,759 B1 | 4/2001 | Tanoue et al. | |
| 6,223,247 B1 | 4/2001 | Otsuka et al. | |
| 6,223,285 B1 | 4/2001 | Komuro et al. | |
| 6,289,102 B1 | 9/2001 | Ueda et al. | |
| 6,353,890 B1 * | 3/2002 | Newman | 713/193 |
| 6,407,976 B2 | 6/2002 | Nagara et al. | |
| 6,516,064 B1 | 2/2003 | Osawa et al. | |
| 6,519,213 B1 * | 2/2003 | Song et al. | 369/44.26 |
| 6,538,982 B1 | 3/2003 | Van Vlerken et al. | |
| 6,549,495 B1 | 4/2003 | Spruit et al. | |
| 6,550,009 B1 * | 4/2003 | Uranaka et al. | 713/168 |
| 6,664,526 B2 * | 12/2003 | Yokoi | 250/201.5 |
| 6,665,240 B1 | 12/2003 | Kobayashi et al. | |
| 6,694,023 B1 | 2/2004 | Kim | |
| 6,708,299 B1 | 3/2004 | Xie | |
| 6,738,342 B2 | 5/2004 | Furumiya et al. | |
| 6,847,604 B2 | 1/2005 | Ueki | |
| 6,885,629 B2 | 4/2005 | Oshima et al. | |
| 6,930,977 B1 | 8/2005 | Kondo et al. | |
| 6,938,162 B1 * | 8/2005 | Nagai et al. | 713/189 |
| 7,006,416 B1 | 2/2006 | Ohgake | |
| 7,142,494 B2 | 11/2006 | Sako et al. | |
| 7,240,221 B2 | 7/2007 | Sako et al. | |
| 7,248,558 B2 | 7/2007 | Kobayashi et al. | |
| 7,266,074 B2 * | 9/2007 | Kim et al. | 369/124.12 |
| 7,400,725 B1 | 7/2008 | Yumiba et al. | |
| 2001/0010666 A1 | 8/2001 | Miyamoto et al. | |
| 2001/0036132 A1 | 11/2001 | Kobayashi et al. | |
| 2001/0046193 A1 | 11/2001 | Akiyama et al. | |
| 2002/0024914 A1 | 2/2002 | Kobayashi | |
| 2002/0031079 A1 | 3/2002 | Kato | |
| 2002/0041686 A1 | 4/2002 | Moriyama et al. | |
| 2002/0048241 A1 | 4/2002 | Kumagai et al. | |
| 2002/0048246 A1 | 4/2002 | Yamaguchi et al. | |
| 2002/0076047 A1 | 6/2002 | Ando et al. | |
| 2002/0080960 A1 | 6/2002 | Kanayama et al. | |
| 2002/0089920 A1 | 7/2002 | Gotoh et al. | |
| 2002/0097871 A1 | 7/2002 | Gotoh et al. | |
| 2002/0114027 A1 | 8/2002 | Horimai | |
| 2002/0144114 A1 | 10/2002 | Barnard et al. | |
| 2002/0181358 A1 | 12/2002 | Sako | |
| 2003/0007432 A1 | 1/2003 | Minamino et al. | |
| 2003/0012375 A1 | 1/2003 | Sako et al. | |
| 2003/0048725 A1 | 3/2003 | Lee et al. | |
| 2003/0053404 A1 | 3/2003 | Kondo | |
| 2003/0117920 A1 | 6/2003 | Sako et al. | |
| 2003/0174605 A1 | 9/2003 | Sako et al. | |
| 2003/0185128 A1 | 10/2003 | Shoji et al. | |
| 2004/0076110 A1 | 4/2004 | Hino et al. | |
| 2004/0100888 A1 | 5/2004 | Kanda et al. | |
| 2004/0120247 A1 | 6/2004 | Lee et al. | |
| 2004/0151091 A1 | 8/2004 | Ma et al. | |
| 2005/0018555 A1 | 1/2005 | Sabi et al. | |
| 2005/0099916 A1 | 5/2005 | Jeon et al. | |
| 2005/0122889 A1 | 6/2005 | Kobayashi et al. | |

FOREIGN PATENT DOCUMENTS

| | | | |
|---|---|---|---|
| CN | 1293810 A | | 5/2001 |
| CN | 1362707 | | 8/2002 |
| EP | 0 545 472 | | 6/1993 |
| EP | 0 299 573 | | 10/1993 |
| EP | 0723216 | | 7/1996 |
| EP | 0756279 | | 1/1997 |
| EP | 0 807 929 | | 11/1997 |
| EP | 0898271 | | 2/1999 |
| EP | 0 936 610 | | 8/1999 |
| EP | 0997899 | | 5/2000 |
| EP | 1 028 423 | | 9/2000 |
| EP | 1 058 254 | | 12/2000 |
| EP | 1 122 729 | | 8/2001 |
| EP | 1067540 A2 * | | 10/2001 |
| EP | 1152412 | | 11/2001 |
| EP | 1 168 312 | | 1/2002 |
| EP | 1168328 | | 1/2002 |
| EP | 1 229 537 | | 8/2002 |
| JP | 05-036194 | | 2/1993 |
| JP | 05-325193 | | 12/1993 |
| JP | 07-272282 | | 10/1995 |
| JP | 08-124171 | | 5/1996 |
| JP | 08-147704 | | 6/1996 |
| JP | 09-081938 | | 3/1997 |
| JP | 09-128874 | | 5/1997 |
| JP | 10-003746 | | 1/1998 |
| JP | 10-172149 | | 6/1998 |
| JP | 10-269577 | | 10/1998 |
| JP | 11-066739 | | 3/1999 |
| JP | 11-086436 | | 3/1999 |
| JP | 11-261950 | | 9/1999 |
| JP | 11-306648 | | 11/1999 |
| JP | 11-317002 | | 11/1999 |
| JP | 2000-113452 | | 4/2000 |
| JP | 2000-149415 | | 5/2000 |
| JP | 2000-195049 | | 7/2000 |
| JP | 2000-195094 | | 7/2000 |
| JP | 2000-231722 | | 8/2000 |
| JP | 2000-298941 | | 10/2000 |
| JP | 2001-135021 | | 5/2001 |
| JP | 2001-167517 | | 6/2001 |
| JP | 2001-189051 | | 7/2001 |
| JP | 2001-243355 | | 9/2001 |
| JP | 2001-256678 | | 9/2001 |
| JP | 2001-332031 | | 11/2001 |
| JP | 2001-344765 | | 12/2001 |
| JP | 2002-042347 | | 2/2002 |
| JP | 2002-124034 | | 4/2002 |
| JP | 2002-163857 | | 6/2002 |
| JP | 2002-190159 | | 7/2002 |
| JP | 2002-197674 | | 7/2002 |
| JP | 2002-197789 | | 7/2002 |
| JP | 2002-203369 | | 7/2002 |
| JP | 2002-203374 | | 7/2002 |
| JP | 2002-216360 | | 8/2002 |
| JP | 2002-304809 | | 10/2002 |
| JP | 2002-311976 | | 10/2002 |
| JP | 2002-319245 | | 10/2002 |
| JP | 2002-367281 | | 12/2002 |
| JP | 2003-006997 | | 1/2003 |
| KR | 2001-0051834 | | 6/2001 |
| KR | 2004-0048476 | | 6/2004 |
| TW | 357346 | | 5/1999 |
| TW | 368649 | | 9/1999 |
| TW | 408290 | | 10/2000 |
| TW | 449737 | | 8/2001 |
| TW | 501131 | | 9/2002 |
| TW | 512238 | | 12/2002 |
| TW | 512316 | | 12/2002 |
| TW | 514895 | | 12/2002 |
| WO | WO 97/45836 | | 12/1997 |
| WO | WO 00/21085 | | 4/2000 |
| WO | WO 01/03136 | | 1/2001 |
| WO | WO 01/52250 A1 | | 7/2001 |
| WO | WO 02/15183 | | 2/2002 |
| WO | WO 02/31821 A1 | | 4/2002 |
| WO | WO 03/003358 | | 1/2003 |
| WO | WO 02/37493 | | 6/2003 |
| WO | WO 2004/066286 | | 8/2004 |
| WO | WO 2004/095439 | | 11/2004 |

OTHER PUBLICATIONS

International Search Report dated May 6, 2004.
International Search Report dated May 18, 2004.
Korean Office Action dated Mar. 28, 2005.
Korean Office Action dated Mar. 30, 2006.
European Search Report dated Jun. 12, 2006.
European Search Report dated Sep. 22, 2006.
European Search Report dated Nov. 24, 2006.
Russian Office Action dated Jan. 30, 2007.
Taiwanese Office Action dated Jul. 10, 2007.
Japanese Office Action dated Aug. 24, 2007.
European Search Report dated Oct. 29, 2007.

European Search Report dated Nov. 7, 2007.
Japanese Office Action dated Jan. 16, 2008.
European Search Report dated Mar. 12, 2008.
Japanese Office Action dated Mar. 17, 2008.
Japanese Office Action dated Mar. 24, 2008.
European Search Report dated Mar. 26, 2008.
European Search Report dated Apr. 2, 2008.
Japanese Office Action dated Aug. 20, 2008.
Chinese Office Action dated Jul. 4, 2008.
Japanese Office Action corresponding to Japanese Application No. 2006-500635 dated Aug. 26, 2008.
Chinese Office Action corresponding to Chinese Application No. 200480000399.8 dated Dec. 19, 2008.
Japanese Office Action dated Jul. 14, 2009.
Korean Office Action dated Jul. 18, 2009.
Japanese Office Action dated Jul. 21, 2009.
Japanese Office Action dated Jun. 16, 2009.
Japanese Office Action dated Dec. 15, 2009 for corresponding Japanese Patent Application No. 2008-319384.
European Office Action dated Dec. 14, 2009 for corresponding European Patent Application No. 06001614.4.
Japanese Office Action dated Jan. 12, 2010 for corresponding Japanese Patent Application No. 2007-243684.
Japanese Office Action dated Mar. 2, 2010 for corresponding Japanese Application No. 2006-76406.
United States Office Action dated Feb. 16, 2010 for corresponding U.S. Appl. No. 11/367,599.
Taiwanese Office Action dated Jan. 24, 2010 with English translation for corresponding Taiwanese Application No. 095114984.
Taiwanese Office Action dated Aug. 5, 2010 in corresponding Application No. 093101544.
U.S. Office Action dated Nov. 10, 2010 in related U.S. Appl. No. 11/357,059.
Office Action for Taiwanese Application No. 093101547 dated Jan. 4, 2011 and English translation thereof.
Taiwanese Office Action dated Jun. 17, 2010 in corresponding application TW93101547, with English translation.
Office Action dated Jul. 13, 2010 in corresponding U.S. Appl. No. 10/516,910.
U.S. Office Action dated Feb. 3, 2011 in related U.S. Appl. No. 10/516,910.
Office Action for corresponding U.S. Appl. No. 11/367,305 dated Mar. 24, 2011.
Office Action for corresponding Japanese Application No. 2006-76406 dated May 24, 2011.
Japanese Office Action corresponding to Japanese Application No. 2006-500635 dated Aug. 26, 2008.

* cited by examiner

Biphase modulated HFM groove

FIG. 5

| Byte number | Contents | number of bytes |
|---|---|---|
| 0 | Disc Information identifier = "DI" | 2 |
| 2 | DI format | 1 |
| 3 | Reserved = 00h | 1 |
| 4 | Number of DI frames in each DI Block | 1 |
| 5 | DI Frame sequence number in DI Block | 1 |
| 6 | Number of DI bytes in use in this DI Frame | 1 |
| 7 | Reserved = 00h | 1 |
| 8 to 10 | disc type identifier = "BDO" | 3 |
| 11 | disc size / version | 1 |
| 12 | disc structure | 1 |
| 13 | channel bit length | 1 |
| 14 to 15 | Reserved = all 00h | 2 |
| 16 | BCA descriptor | 1 |
| 17 | maxium transfer rate of application | 1 |
| 18 to 23 | Reserved = all 00h | 6 |
| 24 to 31 | Data zone allocation | 8 |
| 32 to 111 | Reserved = all 00h | 13 | where CPI_rec_Flag (1Byte) is allocated

FIG. 6

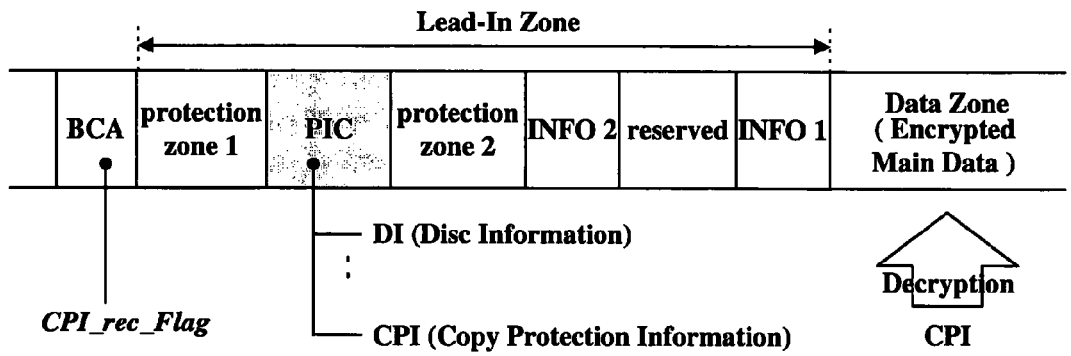

RECORDING MEDIUM WITH COPY PROTECTION INDICATING INFORMATION AND APPARATUS AND METHODS FOR FORMING, RECORDING, REPRODUCING AND RESTRICTING REPRODUCTION OF THE RECORDING MEDIUM

CROSS-REFERENCE TO RELATED APPLICATIONS

This U.S. non-provisional application, the entire contents of which are incorporated by reference, which claims priority of Korean Patent Application No. 2003-004488, filed on Jan. 23, 2003; and Korean Patent Application No. 2003-008317, filed on Feb. 10, 2003, both in the Korean Intellectual Property Office, the entire contents of which are hereby incorporated by reference.

BACKGROUND OF THE INVENTION

1. Field of the Invention

The present invention relates to a recording medium such as BD-ROM (Blu-ray Disc ROM), which includes copy protection indicating information and an apparatus and methods for forming, recording, reproducing, and restricting reproduction of illegally duplicated recording media.

2. Description of the Related Art

Recently, standardization of a new high-density optical disc, a rewritable Blu-ray disc (BD-RE: Blu-ray Disc-Rewritable), have been under development where large quantities of high quality video and audio data can be recorded. Once the standard of a BD-RE has been established, products adopting the new optical discs are expected to be commercially available in the near future.

As illustrated in FIG. 1, a BD-RE has an inner hole, clamping area, transition area, BCA (Burst Cutting Area) area, and lead-in area, located in sequential order along radial direction. A data area and lead-out area reside in the center and outermost annulus of the disc, respectively.

The lead-in area is partitioned into a first guard (Guard 1) area, PIC (Permanent Information & Control data) area, a second guard (Guard 2) area, Info 2 area, OPC (Optimum Power Calibration) area, etc. The first guard area and PIC area are pre-recorded areas, whereas the remaining lead-in areas, data area, and lead-out area correspond to rewritable areas which can be overwritten with new data.

General information of a disc which needs to be permanently preserved may be recorded in the PIC area, which can be encoded in wobbled grooves of a track by HFM (High Frequency Modulation) method. HFM Grooves may be modulated in the radial direction with a rather high bandwidth signal, to create a data channel for replicated information with sufficient capacity and data rate. As shown in FIG. 2, encoding data into wobbled groove can be performed by bi-phase modulation and thus recording.

In this modulation method, a bit with value 0 may be represented by a transition at the start of the bit cell and a bit with value 1 may be represented by a transition at the start and in the middle of the bit cell. The modulated bits may be recorded on the disc by a deviation of the groove from its average centerline as indicated in FIG. 2. The length of each bit cell may be 36T, where T corresponds to the length of a channel bit in the rewritable data areas.

Along with the development of a BD-RE, has been the development of a corresponding read-only disc, a read-only Blu-ray disc (hereinafter, referred to as 'BD-ROM'). As shown in FIG. 3, the BD-ROM disc may include an inner area, clamping area, transition area, information area, and rim area.

The main data of an audio/video (A/V) stream recorded in a data zone within an information area can be recorded with encryption with copy protection information (CPI) to prevent unauthorized copy.

Various disc information (DI) about the disc, such as the type of a disc, may be recorded in the PIC area within the information area. When encrypted main data are recorded in the data zone, copy protection information (CPI) for decryption can also be recorded in PIC area.

When an optical disc apparatus playing a recording medium performs initial servo operations in accordance with the insertion of a disc, copy protection information (CPI) recorded in the PIC area is detected. If main data recorded in a pre-recorded data area is found to be encrypted, the main data is output after decryption using the copy protection information.

Even when copy protection information is not recorded in the PIC area because the contents recorded in data area of a BD-ROM are not encrypted, an optical disc apparatus performing initial servo operations still performs a series of operations to detect copy protection information in the PIC area under the assumption that encryption has been applied to the contents. Such a preliminary operation can cause a delay in the playback of actual data. Also, if any data is recorded on the rewritable disk, i.e., BD-RE, or recordable disk, i.e., BD-WO and its data is copy protected, a similar problem exists when the data is reproduced.

Further, if copy protection information is not detected, it cannot be determined whether there is no copy protection information initially because the disc is an illegal medium, or there is no copy protection information because the disc is a legal and copy-free medium.

SUMMARY OF THE INVENTION

In exemplary embodiments, the present invention is directed to a recording medium, such as a high-density and/or read-only recording medium, such as BD-ROM, which includes copy protection indicating information, which can identify whether copy protection information is needed or not for the playback of contents stored on the recording medium, and to methods and apparatuses for forming, recording, and reproducing data on the recording medium.

In exemplary embodiments, the present invention is directed to a recording medium, such as a high-density and/or read-only recording medium, such as BD-ROM, which includes information in a particular area indicating whether or not copy protection information to decrypt recorded contents is present, and to methods and apparatuses for forming, recording, and reproducing data on the recording medium.

In exemplary embodiments, the present invention is directed to a recording medium, such as a high-density and/or read-only recording medium, such as BD-ROM, which includes information regarding the presence of copy protection information in the disc information, and to methods and apparatuses for forming, recording, and reproducing data on the recording medium.

In exemplary embodiments, the present invention is directed to a recording medium, such as a high-density and/or read-only recording medium, such as BD-ROM, which includes information regarding the presence of copy protection information as header information of a copy protection information field, and to methods and apparatuses for forming, recording, and reproducing data on the recording medium.

In exemplary embodiments, the present invention is directed to a recording medium, such as a high-density and/or read-only recording medium, such as BD-ROM, which includes copy protection indicating information, which is used to determine whether copy protection information is present and whether decryption is necessary, and to methods and apparatuses for forming, recording, and reproducing data on the recording medium.

In exemplary embodiments, the present invention is directed to a recording medium, such as a high-density and/or read-only recording medium, such as BD-ROM, which includes copy protection indicating information, which is used to determine whether copy protection information is present and whether decryption is necessary, playback of contents is directly started, irrespective of whether or not recorded contents have been encrypted, and to methods and apparatuses for forming, recording, and reproducing data on the recording medium.

In exemplary embodiments, the present invention is directed to a recording medium, such as a high-density and/or read-only recording medium, such as BD-ROM, which includes copy protection indicating information indicating whether or not the recording medium contains copy protection information for use in encrypting/decrypting data, wherein the copy protection indicating information and/or the copy protection information are recorded in wobbled patterns on an area of the recording medium.

In exemplary embodiments, the present invention is directed to a method for copy protection, which includes utilizing copy protection indicating information to indicate whether or not the recording medium contains copy protection information for use in encrypting/decrypting the data, to reproduce the data, wherein the copy protection indicating information and/or the copy protection information are recorded in wobbled patterns on an area of the recording medium.

In exemplary embodiments, the present invention is directed to a method for copy protection, which includes detecting copy protection indicating information indicating whether or not the recording medium contains copy protection information for use in encrypting/decrypting the data, wherein the copy protection indicating information and/or the copy protection information are recorded in wobbled patterns on an area of the recording medium; and playing the data utilizing the copy protection information if the recording medium contains copy protection information for use in decrypting the data, or playing the data directly without utilizing the copy protection information, if the recording medium does not contain copy protection information for use in decrypting the data, based on the detected copy protection indicating information.

In exemplary embodiments, the present invention is directed to a method for copy protection, which includes utilizing copy protection indicating information to indicate whether or not the recording medium contains copy protection information for use in encrypting/decrypting the data, wherein the copy protection indicating information and/or the copy protection information are recorded in wobbled patterns on an area of the recording medium and recording the data based on the copy protection information.

In exemplary embodiments, the present invention is directed to an apparatus for copy protection, wherein said apparatus utilizes copy protection indicating information to determine whether or not the recording medium contains copy protection information for use in encrypting/decrypting the data, to reproduce the data based on the copy protection indicating information and the copy protection information, wherein the copy protection indicating information and/or the copy protection information are recorded in wobbled patterns on an area of the recording medium.

In exemplary embodiments, the present invention is directed to an apparatus for copy protection, which includes a detector detecting signals recorded on the recording medium, the signal including copy protection indicating information to determine whether or not the recording medium contains copy protection information for use in encrypting/decrypting the data, wherein the copy protection indicating information and/or the copy protection information are recorded in wobbled patterns on an area of the recording medium; and a signal processor for playing the data utilizing the copy protection information if the recording medium contains copy protection information for use in decrypting the data, or playing the data directly without utilizing the copy protection information, if the recording medium does not contain copy protection information for use in encrypting/decrypting the data based on the copy protection indicating information.

BRIEF DESCRIPTION OF THE DRAWINGS

The accompanying drawings, which are included to provide a further understanding of the invention, illustrate exemplary embodiments of the invention, and together with the description, serve to explain the principles of the present invention.

In the drawings:

FIG. 5 is a diagram illustrating the fields of disc information recorded and managed in a high-density Blu-ray disc, wherein a flag indicating the presence of copy protection information is included in an exemplary embodiment of the present invention;

FIG. 6 is a diagram illustrating an exemplary embodiment wherein recorded in the BCA area of a Blu-ray disc according to the present invention is information indicating whether or not copy protection information is recorded;

DETAILED DESCRIPTION OF EXEMPLARY EMBODIMENTS

Hereinafter, a high-density read-only recording medium according to exemplary embodiments of the present invention and exemplary embodiments of apparatuses and methods for forming, recording, and reproducing copy protection information will be described in detail with reference to the appended drawings.

Figure 3:
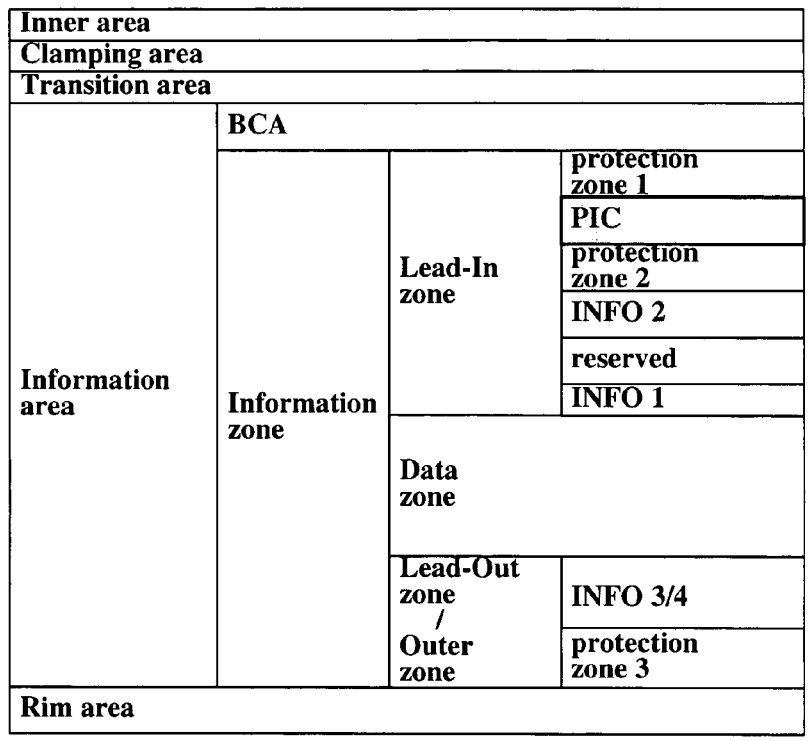
FIG. 3 is a diagram illustrating each area allocated in a read-only Blu-ray disc (BD-ROM) in an exemplary embodiment of the present invention.

As stated above with reference to FIG. 3, a read-only Blu-ray disc (BD-ROM) according to exemplary embodiments of the present invention has a disc structure including inner area, clamping area, transition area, information area, and rim area.

Figure 4:
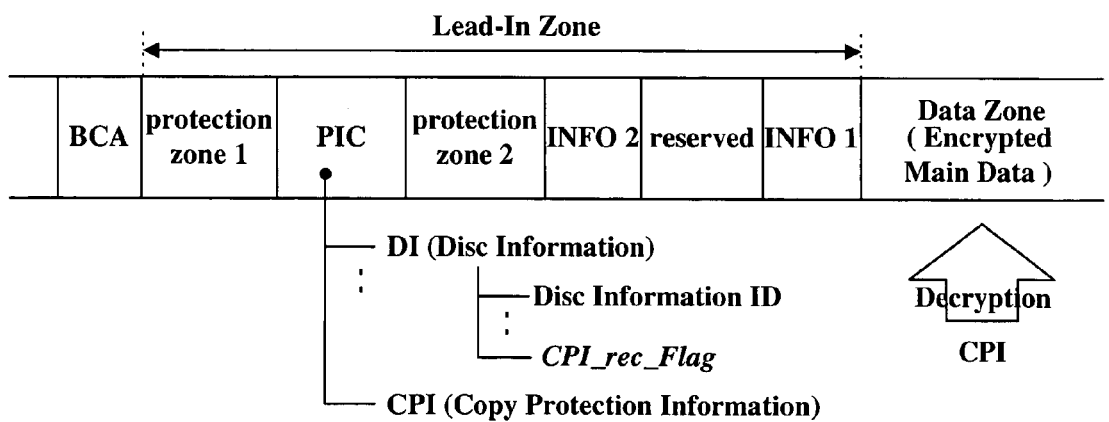
FIG. 4 is a diagram illustrating an exemplary embodiment wherein information regarding the presence of copy protection information is recorded in the PIC area of a Blu-ray disc according to an exemplary embodiment of the present invention.

As shown in FIG. 4, disc information corresponding to general information of a disc as well as encrypted main data recorded in data zone, for example, copy protection information required to decrypt A/V data streams may be recorded in the PIC area allocated in the information area.

When the main data is recorded without encryption in the data zone, the copy protection information need not be particularly recorded in the PIC area.

Accordingly, a flag to indicate whether or not copy protection information is recorded in the PIC area may be included in the disc information recorded in the PIC area. The flag (CPI_rec_Flag) indicates the presence of copy protection information and may have a recording size of one byte.

As shown in FIG. 5, one byte is allocated to record the flag indicating the presence of copy protection information within the area reserved for the disc information.

Also, the disc information in the PIC area can be recorded for several times. The flag byte may be recorded only in the first disc information among multiple of disc information which are recorded repeatedly in the PIC area.

As illustrated in FIG. 6, the flag indicating whether or not the copy protection information is recorded may be recorded in another area, e.g., the BCA (Burst Cutting Area) area allocated in the inner ring of the PIC area wherein copy protection information is recorded.

Copy protection information, along with the flag indicating the presence thereof, may be encoded and recorded in wobbled pits rather than in straight pits where data are recorded in general case. To this purpose, pits may be formed in wobbled pattern (or in a zigzag pattern) within as many track sections as needed. Also, it may be encoded and recorded in wobbled pits and straight pits alternatively and/or intermittently within the PIC area. Otherwise, it may be selectively or repeatedly recorded on other area except for the PIC area. It may be recorded by an HFM groove wobbled method such as BD-RE.

The copy protection information may include a key value for encrypting the main data to be recorded on data area.

Figure 7:
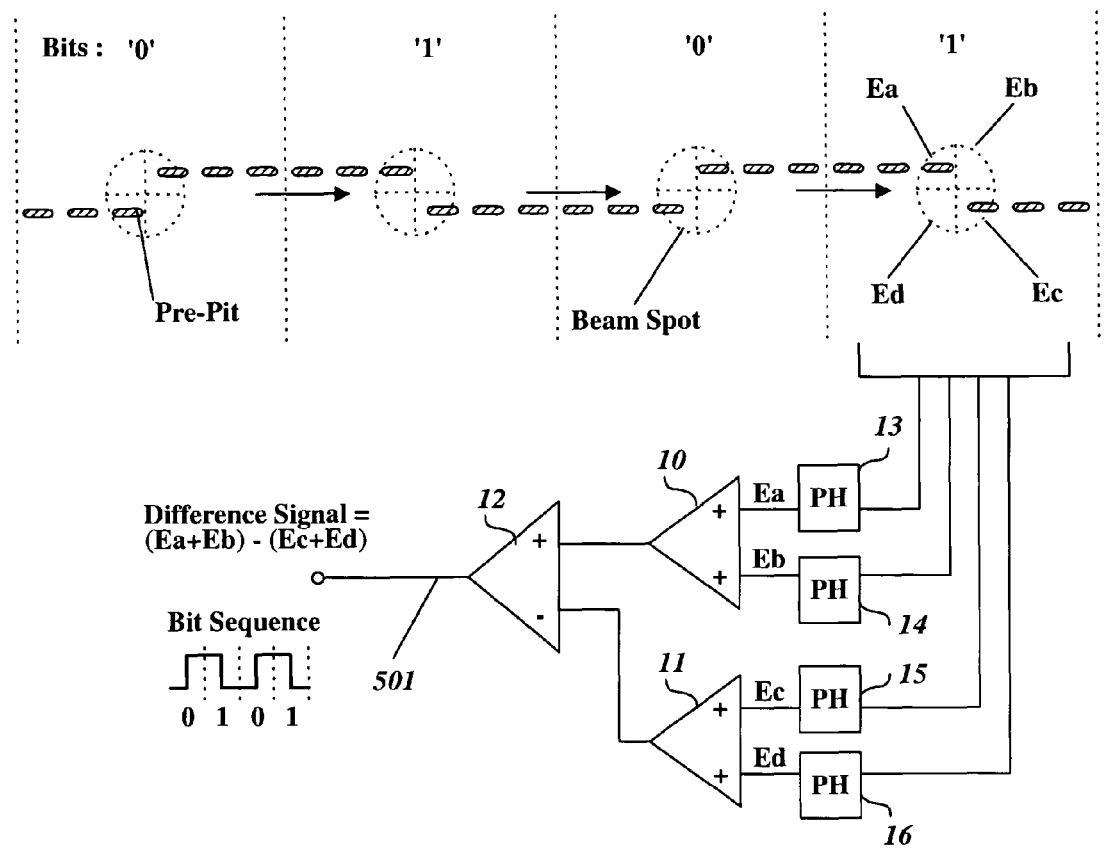
FIG. 7 is a diagram illustrating a process restoring data encoded in wobbled pits according to an exemplary embodiment of the present invention.

FIG. 7 is a diagram illustrating an example where data is encoded in wobbled pits by bi-phase modulation, whereby data are detected. In FIG. 7, the value of '0101' is encoded in bi-phase modulated form, e.g., bi-phase modulated HFM Groove, along with wobbled pattern of wobbled pits. The recording example of wobbled pits in FIG. 7 comprises 36Ts (including marks and spaces) where six 3T signals (mark) make up of the value of one bit. In the example, left and right transition of a sequence of six pits denoting '1' and a sequence of six pits denoting '0' are provided in opposite directions.

Figure 1:
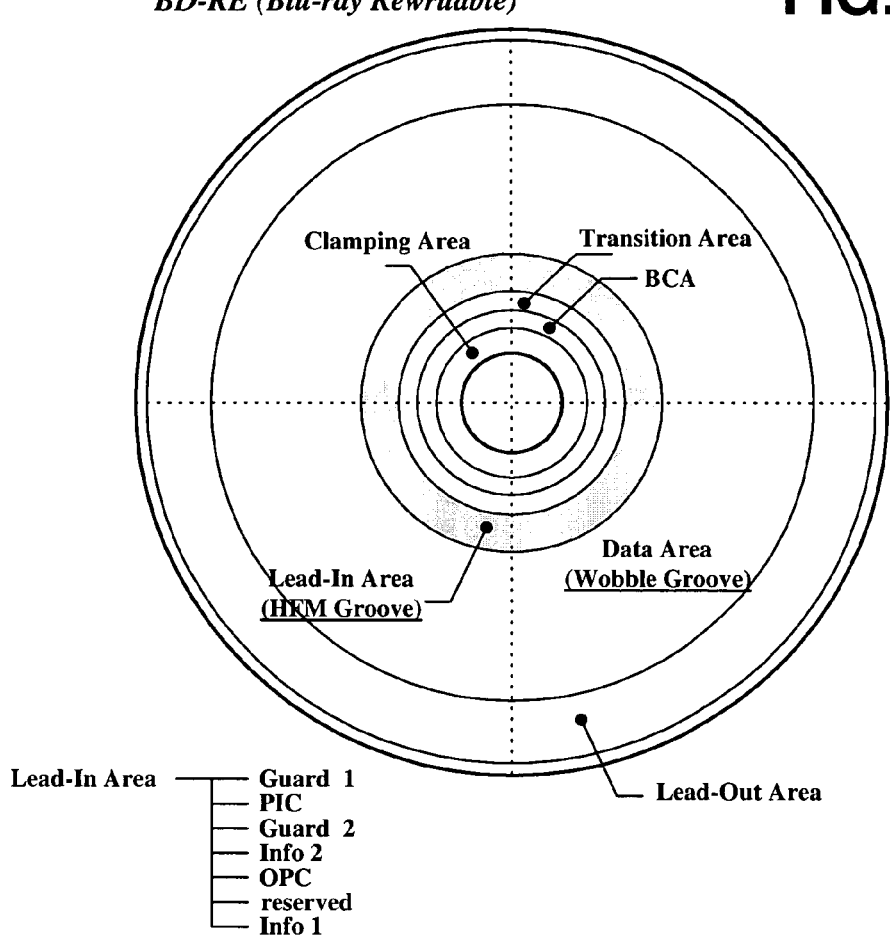
FIG. 1 is a diagram illustrating the disc structure of a conventional rewritable Blu-ray disc (BD-RE)
Figure 2:
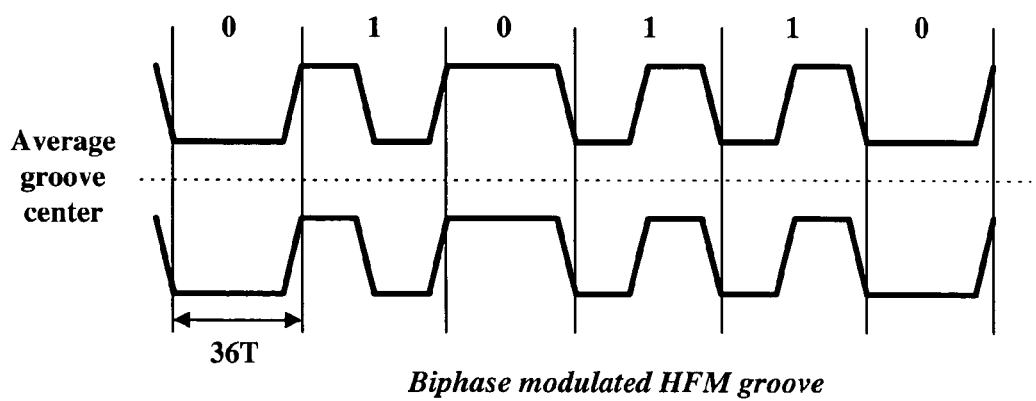
FIG. 2 is a diagram illustrating the high frequency modulation (HFM) groove formed in the PIC area of a rewritable Blu-ray disc.

As shown in FIG. 7. the structure by bi-phase modulation is different from the structure illustrated in FIG. 2. That is, the method of FIG. 2 has a bit with value 0, which is represented by a transition at the start of the bit cell and a bit with value 1, which is represented by a transition at the start and in the middle of the bit cell. Otherwise, the method of FIG. 7 has a bit with value 0, which is represented by a transition at the start of low and in the middle of high, and a bit with value 1, which is represented by the transition in the opposite direction. The combination of bits consists of data to detect information recorded as wobbled pit. The wobbled pit can be copy protection information, i.e., key data to decrypt main data recorded on the data zone of the recording medium as shown in FIG. 4A to 4F That is, the wobbled pit data can be reproduced or detected only when the bi-phased modulation data is detected or reproduced normally. And also, reproduction or decryption of main data is possible only when the wobbled pit data for copy protection is reproduced or detected using the normally detected or reproduced bi-phase modulation data.

When information is recorded in pits, identical pits need not be repeated but modulated varying pits (2T-8T) in accordance with input information may be recorded. In this case, too, however, the position of a pit sequence (namely, phase) is shifted approximately by every 18Ts in order to encode data into wobbled pattern of wobbled pits.

The reflected light reflected from wobbled pits recorded in such a manner undergoes a photoelectric transform by four quadrant light receiving elements 13-16.

As illustrated in FIG. 7, THE photoelectrically transformed electrical signals (Ea, Eb, Ec, Ed) are amplified by a circuit for conventional push-pull track control. More specifically, left and right-side signals of the track (Ea+Eb, Ec+Ed) are amplified by respective amplifiers 10, 11 and the difference signal 501 of the left and right-side signals ((Ea+Eb)-(Ec+Ed)) is output by a differential amplifier 12. When the difference signal 501 is converted a binary signal based on whether its level is above or below a reference, encoded data in wobbled pattern of wobbled pits may be obtained.

Because signals detected from the wobbled pattern of wobbled pits are not available externally, even if data played from a BD-ROM were copied onto another recording medium other than the BD-ROM, playback of the copied data would be impossible.

Instead of recording data in wobbled pattern, if data were recorded in the PIC area according to a different agreement for recording format between manufactures having legal authorities, copying a BD-ROM by unauthorized manufactures can also be made more difficult.

Figure 8:
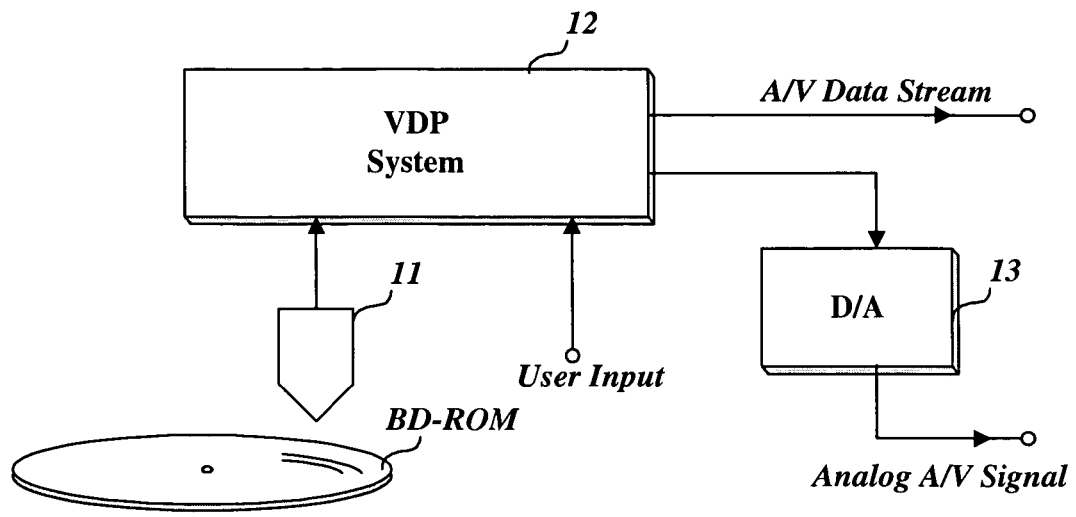
FIG. 8 is a diagram illustrating a simplified structure of an optical disc apparatus capable of playing a high-density Blu-ray disc in accordance with an exemplary embodiment of the present invention.
Figure 9:
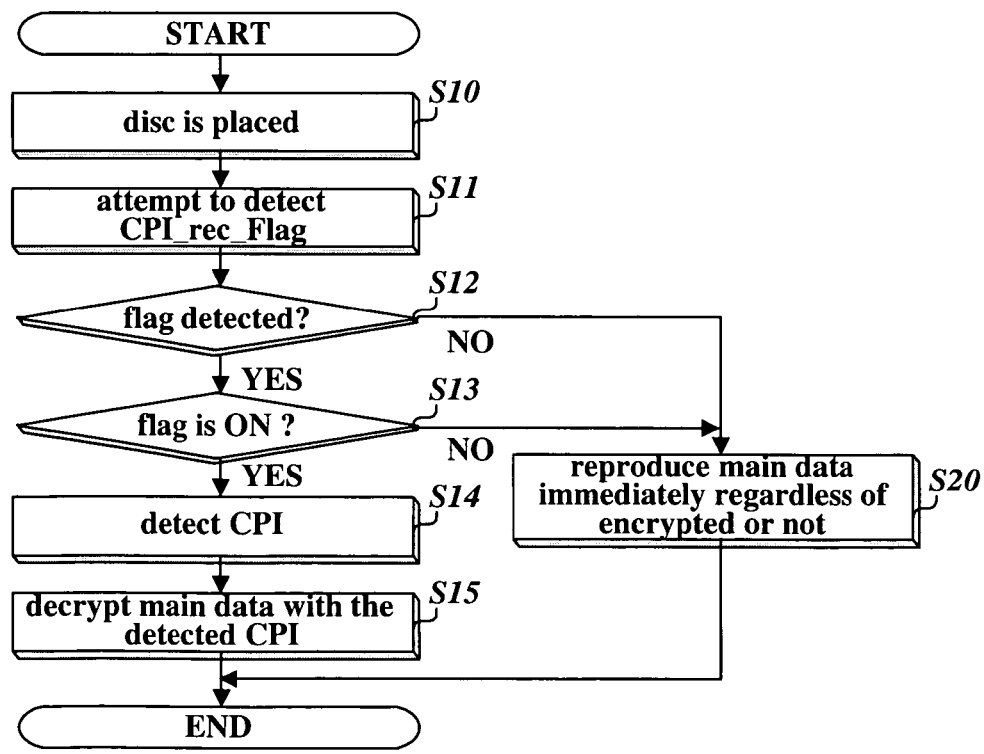
FIG. 9 is a flowchart illustrating the process of playing a high-density Blu-ray optical disc according to an exemplary embodiment of the present invention.

FIG. 8 is a simplified diagram illustrating an optical disc apparatus playing a recording medium of a disc. The apparatus includes an optical pickup 11; VDP (Video Disc Play) system 12 performing signal processing and servo control; and a D/A converter 13. The optical disc apparatus may perform playback processing according to whether or not copy protection information is recorded, as described in conjunction with FIG. 9.

The VDP system 12 of the disc apparatus detects and checks a flag (CPI_rec_Flag) indicating whether or not copy protection information among disc information recorded in the PIC area or encoded in the wobbled pits of an inserted BD-ROM is recorded (S11); otherwise, a flag recorded in the BCA area of a BD-ROM is detected (S11), whereby it is determined whether or not copy protection information is recorded.

If the flag is detected, its value is checked (S13). If the value indicates that copy protection information is recorded, the VDP system 12 of the optical disc apparatus performs (S14) the operation of detecting copy protection information recorded in the PIC area or encoded in the wobbled pits; thereafter, by using the copy protection information, a series of data play operations decrypting and playing encrypted data recorded in the data zone are performed (S15).

When the value of the flag indicates the absence of copy protection information or the flag indicating the presence of copy protection information is not detected, the VDP system 12 omits unnecessary operations to detect non-existent copy protection information in the PIC area, but directly performs the operations of reading out recorded contents in the data area.

As shown in the exemplary embodiment of FIG. 5, the flag indicating whether or not copy protection information is recorded, instead of being included and recorded in the disc information, may be recorded in the PIC area together with copy protection information.

Figure 10:
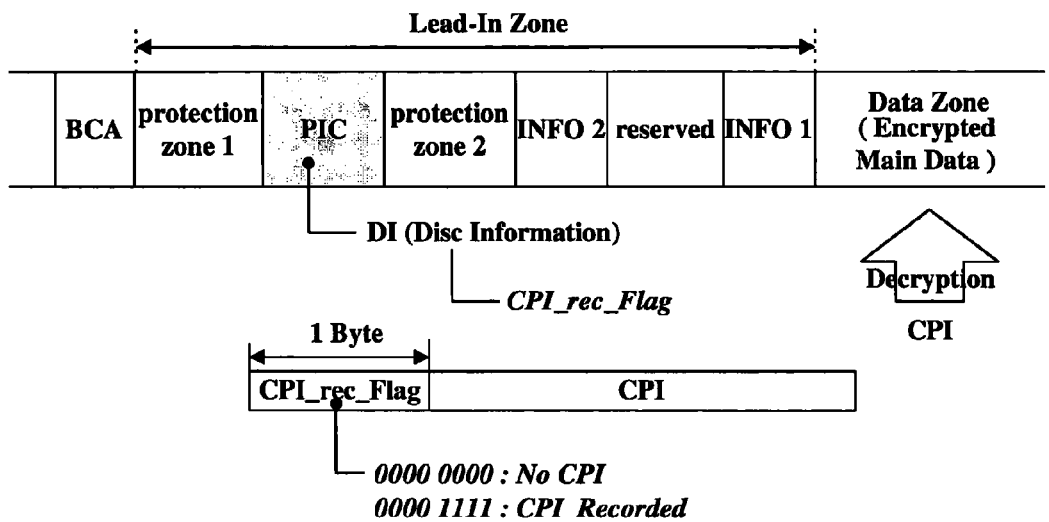
FIGS. 10 and 11 are diagrams illustrating respectively the exemplary embodiments according to the present invention, wherein recorded in a Blu-ray disc are information indicating whether or not copy protection information is recorded.

FIG. 10 is an exemplary embodiment illustrating such an arrangement. As shown in the exemplary embodiment of FIG. 10, the flag (CPI_rec_Flag) indicating the presence of copy protection information may be recorded as header information of copy protection information field.

The flag indicating whether or not copy protection information is recorded may have a recording size of one byte. When the value of the flag is '0000 0000', the flag indicates that copy protection information is not recorded (in this case, a succeeding copy protection information field may be filled with '00'.) When the value of the flag is '0000 1111', the flag indicates that copy protection information is recorded.

In other exemplary embodiments, copy protection information having a flag indicating whether or not copy protection information is recorded as a header information can be recorded in a particular recording area other than the PIC area, for example, the BCA area.

Copy protection information having a flag indicating whether or not copy protection information is recorded can be recorded in a field of disc information stored in the PIC area. Alternatively, it may be recorded as an independent structure from the disc information.

Figure 11:
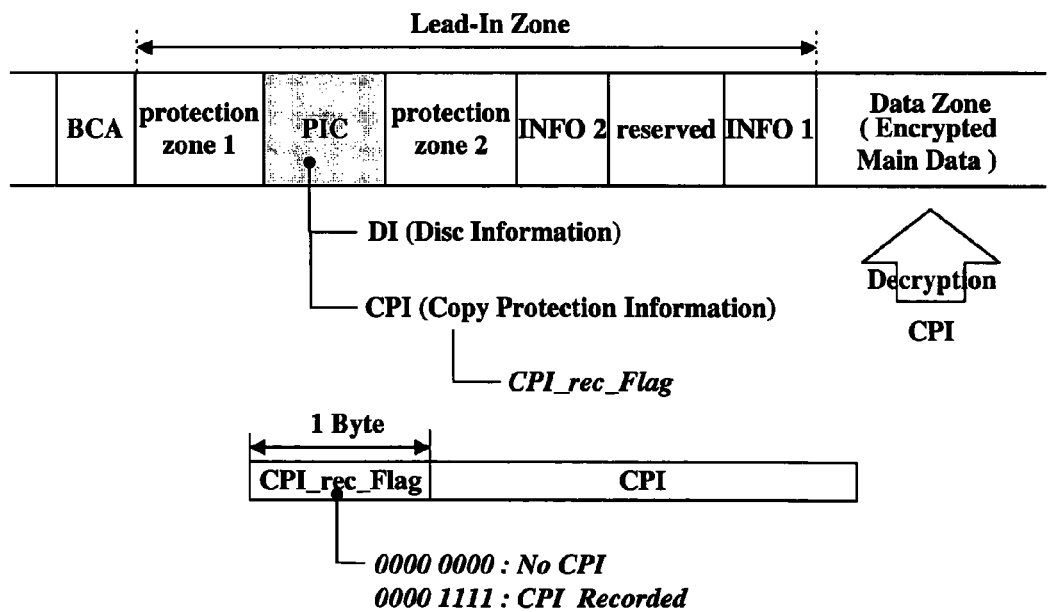

FIG. 11 describes an exemplary embodiment wherein copy protection information is recorded in the PIC area independently of the disc information.

In the exemplary embodiment of FIG. 11, the flag indicating whether or not copy protection information is recorded also appears in the header of copy protection information. When the value of the flag is '0000 0000', the flag indicates that copy protection information is not recorded (In this case, succeeding copy protection information field may be filled with the value of '00'.) When the value of the flag is '0000 1111', the flag indicates that copy protection information is recorded.

As described above, a high-density read-only recording medium and methods for recording copy protection information/playing thereof according to exemplary embodiments of the present invention allows a direct playback of contents stored in a high-density read-only disc unless the contents had been encrypted, whereas proper playback is achieved by reading out decryption information from the disc when encryption has been applied to the contents.

In addition, information for decoding encrypted data is recorded in a form of copy-resistant wobbled pits, whereby illegal copy of the contents stored in a high-density read-only disc is prohibited.

Although exemplary embodiments of the present invention have been described in conjunction with a high-density, read-only recording medium, the teachings of the present invention are also applicable to other recording media, such as recordable, rewritable, or rewritable once media and methods and apparatuses associated therewith, as would be known to one of ordinary skill in the art.

The foregoing description of exemplary embodiments of the present invention has been presented for purposes of illustration; therefore, those skilled in the art may utilize the invention and various embodiments with improvements, modifications, substitutions, or additions within the spirit and scope of the invention as defined by the following appended claims.

What is claimed is:

1. A non-transitory computer readable medium having a first data field area for storing copy protection information, comprising:
   a data area for storing main data; and
   a lead-in area for storing copy protection indicating information indicating if the computer readable medium contains the copy protection information in the first data field area or if the computer readable medium does not contain the copy protection information in the first data field area,
   the copy protection information being encryption/decryption key information required for use in encrypting/decrypting the main data,
   the copy protection indicating information being included within a control information unit including at least medium size information, medium structure information, and data zone allocation information,
   the control information unit being repeatedly recorded in a second data field area in the lead-in area of the computer readable medium,
   the copy protection indicating information and the copy protection information being recorded in a wobbled pattern by a bi-phased modulation method,
   the first data field area being separated from the second data field area, and
   the copy protection information being present depending on the indication of the copy protection indicating information.

2. The computer readable medium according to claim 1, wherein the copy protection indicating information signifies to reproduce the main data directly without utilizing the copy protection information if the copy protection indicating information indicates the computer readable medium does not contain copy protection information.

3. The computer readable medium according to claim 1, wherein the copy protection indicating information signifies to reproduce the main data based on the copy protection information if the copy protection indicating information indicates the computer readable medium contains copy protection information.

4. A method of forming an area of a recording medium that includes a first data field area for storing copy protection information, comprising:
   forming a data area for strong main data; and
   forming a portion of a lead-in area storing copy protection indicating information indicating if the recording medium contains the copy protection information in the first data field area or if the recording medium does not contain the copy protection information in the first data field area,
   the copy protection information being encryption/decryption key information required for use in encrypting/decrypting the main data,
   the copy protection indicating information being included within a control information unit including at least medium size information, medium structure information, and data zone allocation information,
   the control information unit being repeatedly recorded in a second data field area in the lead-in area of the recording medium,
   the copy protection indicating information and the copy protection information being recorded in a wobbled pattern by a bi-phased modulation method,
   the first data field area being separated from the second data field area, and
   the copy protection information being present depending on the indication of the copy protection indicating information.

5. A method of reproducing main data, the method comprising:
   utilizing copy protection indicating information indicating if a recording medium contains the copy protection information in a first data field area or if the recording medium does not contain the copy protection information in the first data field area, the copy protection information being encryption/decryption key information required for use in encrypting/decrypting the main data, the copy protection indicating information being included within a control information unit including at least medium size information, medium structure information, and data zone allocation information, the control information unit being repeatedly recorded in a second data field area in a lead-in area of the recording medium, the copy protection indicating information and the copy protection information being recorded in a wobbled pattern by a bi-phased modulation method the first data field area being separated from the second data field area, and the copy protection information being present depending on the indication of the copy protection indicating information.

6. The method according to claim 5, further comprising reproducing the main data utilizing the copy protection information if the recording medium contains copy protection information for use in encrypting/decrypting the main data, or reproducing the main data directly without utilizing the copy protection information, if the recording medium does not contain copy protection information for use in encrypting/decrypting the main data.

7. The method according to claim 6, wherein the reproducing includes detecting bi-phased modulated data and detecting the copy protection information using the bi-phased modulated data if the recording medium contains copy protection information for use in encrypting/decrypting the main data based on the copy protection indicating information.

8. The method according to claim 6, wherein the reproducing includes (i) checking whether the copy protection indicating information is detected, (ii) reproducing the main data directly if the copy protection indicating information is not detected, and (iii) reproducing the main data utilizing the copy protection information if the copy protection indicating information is detected.

9. A method for playing main data of a recording medium, the method comprising:

detecting copy protection indicating information indicating if the recording medium contains the copy protection information in a first data field area or if the recording medium does not contain the copy protection information in the first data field area, the copy protection information being encryption/decryption key information required for use in encrypting/decrypting the main data, the copy protection indicating information being included within a control information unit including at least medium size information, medium structure information, and data zone allocation information, the control information unit being repeatedly recorded in a second data field area in the lead-in area of the recording medium, the copy protection indicating information and the copy protection information being recorded in a wobbled pattern by a bi-phased modulation method, the first data field area being separated from the second data field area, and the copy protection information being present depending on the indication of the copy protection indicating information; and playing the main data utilizing the copy protection information if the recording medium contains copy protection information for use in encrypting/decrypting the main data, or playing the main data directly without utilizing the copy protection information, if the recording medium does not contain copy protection information for use in decrypting the main data, based on the copy protection indicating information.

10. The method according to claim 9, wherein the recording medium does not contain copy protection information for use in encrypting/decrypting the main data if the copy protection indicating information indicates the recording medium does not contain copy protection information.

11. The method according to claim 9, wherein the recording medium does not contain copy protection information for use in encrypting/decrypting the main data if the copy protection indicating information indicates the recording medium contains copy protection information, but a value of the copy protection information indicates that copy protection information is not present.

12. The method according to claim 9, wherein the recording medium contains copy protection information for use in encrypting/decrypting the main data when the copy protection indicating information indicates the recording medium contains copy protection information and a value of the copy protection information indicates that copy protection information is present.

13. The method according to claim 12, wherein said playing includes decrypting the main data utilizing the copy protection information.

14. A method of recording main data on a recording medium, the method comprising:

utilizing copy protection indicating information to indicate if the recording medium contains copy protection information in a first data field area or if the recording medium does not contain the copy protection information in the first data field area, the copy protection information being encryption/decryption key information required for use in encrypting/decrypting the main data, the copy protection indicating information being included within a control information unit including at least medium size information, medium structure information, and data zone allocation information, the control information unit being repeatedly recorded in a second data field area in a lead-in area of the recording medium, the copy protection indicating information and the copy protection information being recorded in a wobbled pattern by a bi-phased modulation method the first data field area being separated from the second data field area, and the copy protection information being present depending on the indication of the copy protection indicating information.

15. The method according to claim 14, wherein the main data may be recorded utilizing the copy protection information if the recording medium contains copy protection information for use in encrypting/decrypting the data, or the main data may be recorded directly without utilizing the copy protection information, if the recording medium does not contain copy protection information for use in encrypting/decrypting the main data.

16. The method according to claim 15, wherein the recording medium does not contain copy protection information for use in encrypting/decrypting the main data if the copy protection indicating information indicates the recording medium does not contain copy protection information, wherein the recording records the main data without encryption.

17. The method according to claim 15, wherein the recording medium does not contain copy protection information for use in encrypting/decrypting the main data if the copy protection indicating information indicates the recording medium contains copy protection information, but a value of the copy protection information indicates that copy protection information is not present, wherein the recording records the main data without encryption.

18. The method according to claim 15, wherein the recording medium contains copy protection information for use in encrypting/decrypting the main data when the copy protection indicating information indicates the recording medium contains copy protection information and a value of the copy protection information indicates that copy protection information is present, wherein the recording records the main data encrypted utilizing the copy protection information.

19. The method according to claim 18, wherein encrypting the main data utilizing the copy protection information precedes recording of the data.

20. An apparatus for reproducing main data from a recording medium, said apparatus being configured to utilize copy protection indicating information to determine if the recording medium contains the copy protection information in a first data field area or if the recording medium does not contain the copy protection information in the first data field area, said apparatus being configured to reproduce the main data based on the copy protection indicating information and the copy protection information, the copy protection information being encryption/decryption key information required for use in encrypting/decrypting the main data, the copy protection indicating information being included within a control information unit including at least medium size information, medium structure information, and data zone allocation information, the control information unit being repeatedly recorded in a second data field area in a lead-in area of the recording medium, the copy protection indicating information and the copy protection information being recorded in a wobbled pattern by a bi-phased modulation method, the first data field area being separated from the second data field area, and the copy protection information being present depending on the indication of the copy protection indicating information.

21. The apparatus according to claim 20, wherein said apparatus is configured to reproduce the main data utilizing the copy protection information if the recording medium contains copy protection information for use in encrypting/decrypting the main data, or is configured to reproduce the data directly without utilizing the copy protection information, if the recording medium does not contain copy protection information for use in decrypting the main data.

22. The apparatus according to claim 21, wherein said apparatus is configured to reproduce the main data directly if the copy protection indicating information indicates the recording medium does not contain copy protection information.

23. The apparatus according to claim 21, wherein said apparatus is configured to reproduce the main data directly if the copy protection indicating information indicates the recording medium contains copy protection information, but a value of the copy protection information indicates that copy protection information is not present.

24. The apparatus according to claim 21, wherein said apparatus is configured to reproduce the main data with the copy protection information when the copy protection indicating information indicates the recording medium contains copy protection information and a value of the copy protection information indicates that copy protection information is present.

25. The apparatus according to claim 24, wherein said apparatus is configured to decrypt the main data utilizing the copy protection information.

26. An apparatus for reproducing main data from a recording medium, comprising:

a detector configured to detect signals recorded on the recording medium, the signal including the copy protection indicating information to determine if the recording medium contains the copy protection information in a first data field area or if the recording medium does not contain the copy protection information in the first data field area, the copy protection information being encryption/decryption key information required for use in encrypting/decrypting the main data, the copy protection indicating information being included within a control information unit including at least medium size information, medium structure information, and data zone allocation information, the control information unit being repeatedly recorded in a second data field area in a lead-in area of the recording medium, the copy protection indicating information and the copy protection information being recorded in a wobbled pattern by a bi-phased modulation method the first data field area being separated from the second data field area, and the copy protection information being present depending on the indication of the copy protection indicating information; and a signal processor configured to process the main data utilizing the copy protection information if the recording medium contains copy protection information for use in encrypting/decrypting the main data, or is configured to process the main data directly without utilizing the copy protection information, if the recording medium does not contain copy protection information for use in decrypting the main data based on the copy protection indicating information.

27. The apparatus according to claim 26, wherein said signal processor is configured to process the main data directly if the copy protection indicating information indicates the recording medium does not contain copy protection information.

28. The apparatus according to claim 26, wherein said signal processor is configured to process the main data directly if the copy protection indicating information indicates the recording medium contains copy protection information, but a value of the copy protection information indicates that copy protection information is not present.

29. The apparatus according to claim 26, wherein said signal processor is configured to process the main data utilizing the copy protection information when the copy protection indicating information indicates the recording medium contains copy protection information and a value of the copy protection information indicates that copy protection information is present.

30. The apparatus according to claim 29, wherein said signal processor is configured to decrypt the main data utilizing the copy protection information.

31. The recording medium of claim 1, wherein each control information unit of the repeated control information units stores identical information as each other control information unit.

* * * * *